United States Patent [19]

Larson

[11] Patent Number: 5,554,865
[45] Date of Patent: Sep. 10, 1996

[54] INTEGRATED TRANSMIT/RECEIVE SWITCH/LOW NOISE AMPLIFIER WITH DISSIMILAR SEMICONDUCTOR DEVICES

[75] Inventor: Lawrence E. Larson, Bethesda, Md.

[73] Assignee: Hughes Aircraft Company, Los Angeles, Calif.

[21] Appl. No.: 483,673

[22] Filed: Jun. 7, 1995

[51] Int. Cl.$^6$ .......................... H01L 29/80; H01L 31/112; H01L 31/072; H01L 31/109
[52] U.S. Cl. .......................... 257/275; 257/194; 257/195; 257/197; 257/273
[58] Field of Search .................................. 257/194, 195, 257/197, 198, 273, 275

[56] References Cited

U.S. PATENT DOCUMENTS

| | | | |
|---|---|---|---|
| 5,049,522 | 9/1991 | Stanchina et al. | 437/62 |
| 5,053,348 | 10/1991 | Mishra et al. | 437/41 |
| 5,172,197 | 12/1992 | Nguyen et al. | 357/22 |
| 5,243,207 | 9/1993 | Plumton et al. | 257/273 |
| 5,250,826 | 10/1993 | Chang et al. | 257/273 |
| 5,323,030 | 6/1994 | Koscica et al. | 257/273 |
| 5,412,235 | 5/1995 | Nakajima et al. | 257/275 |
| 5,488,241 | 1/1996 | Journeau | 257/273 |

FOREIGN PATENT DOCUMENTS 62-71256  4/1987  Japan ........................................ 257/275

*Primary Examiner*—Ngân V. Ngô
*Attorney, Agent, or Firm*—V. D. Duraiswamy; W. K. Denson-Low

[57] ABSTRACT

A T/R switch/LNA for a radar's active array antenna includes dissimilar semiconductor devices in a monolithic microwave integrated circuit (MMIC). The devices are selected to best meet the functional requirements of the T/R switch/LNA. In particular, the LNA is realized with a HEMT and the T/R switch is realized with HBTs. The dissimilar devices are adapted from first and second heterostructures that are arranged to be coplanar and separated by an isolation layer.

20 Claims, 4 Drawing Sheets

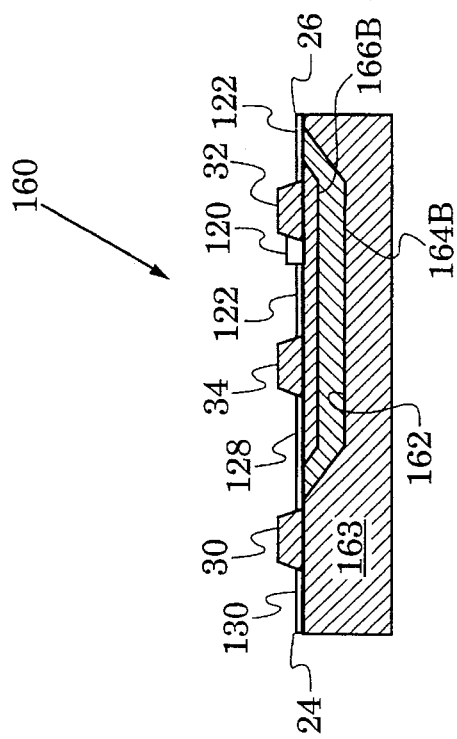
FIG. 6
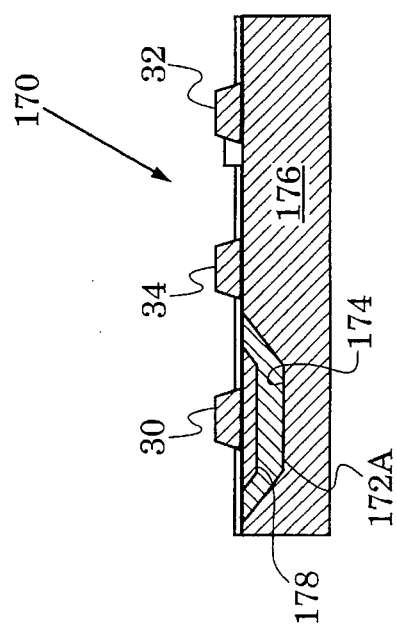
FIG. 8
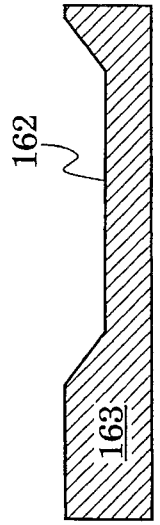
FIG. 7A
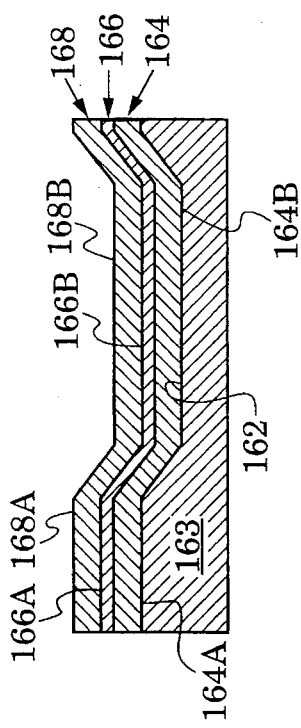
FIG. 7B
FIG. 7C

INTEGRATED TRANSMIT/RECEIVE SWITCH/LOW NOISE AMPLIFIER WITH DISSIMILAR SEMICONDUCTOR DEVICES

BACKGROUND OF THE INVENTION

1. Field of the Invention

The present invention relates generally to radar active array antennas and more particularly to T/R switches and low-noise amplifiers for active arrays.

2. Description of the Related Art

The face of an active array antenna for a pulsed radar system is typically partitioned into an array of transmit/receive (T/R) modules. Each of the T/R modules generally includes a power amplifier, a phase shifter, a microwave switch and a low-noise amplifier (LNA). During the transmit mode of the radar, a low-power, microwave or millimeter-wave signal pulse is fed through a distribution system to deliver a portion of the signal to each T/R module, where it is amplified by the module's power amplifier and radiated from that module's position in the antenna face. The phase of each of the radiated signal portions is selectively set by its respective module's phase shifter so that the antenna's combined radiated energy has a wavefront (a radiation surface of constant phase) with a selected orientation. Because an antenna beam is always orthogonal with its wavefront, the beam will then be steered along a selected axis.

During the receive mode of the radar, a portion of the radar echo signal is received by each T/R module and is amplified in its LNA. In addition, the phase of each receive portion is set by its respective phase shifter to selectively steer the receive antenna beam in the same manner as the transmit antenna beam was steered. The amplified echo signals of the T/R modules are then combined and routed to signal processing circuits for detection of target range and direction.

The radar's sensitivity is a function of the noise figure during the receive mode. Therefore, it is important that each module's LNA is positioned as close to the antenna face as possible to reduce the signal loss that occurs ahead of it. Accordingly, there are no frequency down-conversion circuits preceding the LNAs and they must operate at the radar pulse frequency. However, the LNAs could be damaged by leakage radiation from the transmitted pulse so it is imperative to position a protective element ahead of each LNA, typically in the form of a transmit/receive microwave switch (T/R switch). In the transmit mode, the T/R switch is set to block microwave energy away from the LNA and in the receive mode it is set to conduct microwave energy.

Noise figure at the radar's radiated frequency is the dominant parameter in the selection of transistors for the LNA. In contrast, a high voltage breakdown rating and a low on-resistance are the primary parameters considered in the selection of transistors for the T/R switch. In the absence of other considerations, a high electron mobility transistor (HEMT) and a heterostructure bipolar transistor (HBT) would generally be the transistors of choice for the LNA and the T/R switch, respectively. HEMTs have superior high frequency noise figure, e.g., 6 db at 58 GHz, and HBTs can be configured with high breakdown rating and low on-resistance.

However, the spatial limitations in an active array antenna are best met by realizing the T/R switch and the LNA as a monolithic microwave integrated circuit (MMIC). In a MMIC, all components, e.g., transistors, transmission lines, inductors, resistors and capacitors, are fabricated on the same semiconductor substrate. No bonding between components is required except to connect to the outside world. A variety of integrated circuit fabrication techniques are used, e.g., diffusion, ion implantation, oxidation and film deposition, epitaxial growth, lithography and etching and photoresist. Impedance matching networks and transmission lines are preferably realized in microstrip structures because they provide a free and accessible surface for interconnection. Resistive loads are typically deposited as thin films of an appropriate resistive material. The single-crystal semiconductor layers required to build transistors are generally grown with epitaxial processes, e.g., vapor-phase epitaxy, molecular-beam epitaxy and liquid-phase epitaxy.

A MMIC conventionally includes transistors of the same device type because each type of transistor requires a different sequence of semiconductor layers with different doping levels and thicknesses. For example, Sze, S. M. shows typical HEMT and HBT heterostructures (a heterostructure is a semiconductor structure having adjacent layers of different chemical composition, but of similar crystalline structure) that have different layer arrangements (see pages 285 and 373 of Sze, S. M., *High-Speed Semiconductor Devices*, Wiley-Interspace Publishing, New York, 1990). These dissimilar transistors cannot be fabricated in the same heterostructure.

Because of the difficulty of fabricating dissimilar semiconductor device types on a single MMIC, the spatial limitations of active array antennas have conventionally demanded a compromise in T/R switch/LNA performance, i.e. the selection of a single device type. This compromise is often met by fabricating the MMIC with HEMTs for realizing both the T/R switch and the LNA. In spite of the low breakdown rating of HEMTs, e.g., 5–10 volts, this compromise has usually been chosen because of the overriding importance of noise figure in the radar's sensitivity.

Future active array antenna designs envision increased transmit power levels which will require T/R modules to operate in the presence of higher leakage levels in the transmit mode, e.g., 20–40 watts. These power leakage levels will require the transistors of the T/R switch to withstand breakdown voltages in excess of 30 volts, which is far beyond the typical breakdown rating of HEMTs. In addition, improvements in HEMT breakdown voltage are typically achieved at the cost of increased noise figure, an undesirable compromise. It would be difficult to meet these future active array demands with a single semiconductor device type.

SUMMARY OF THE INVENTION

The present invention is directed to a monolithic, integrated T/R switch/LNA which is realized with dissimilar semiconductor devices that are specifically selected to meet an active array antenna's functional requirements. In particular, the devices that realize the LNA are selected primarily for their noise figure and the devices that realize the T/R switch are selected primarily for their insertion loss and breakdown voltage.

The dissimilar devices are integrated by selecting a semiconductor system that includes at least one semiconductor layer having a first bandgap and at least one semiconductor layer having a second bandgap that is wider than the first bandgap. A substrate and first and second semiconductor heterostructures are formed in the selected system. The substrate is configured with a depression. The first and second heterostructures overlay the substrate, with a portion of the first heterostructure positioned between the second heterostructure and the depression. As a consequence, another portion of the first heterostructure is coplanar with the second heterostructure. An insulative layer isolates the heterostructures, which are then used to form the dissimilar devices.

In a T/R switch/LNA embodiment, the LNA device is a HEMT and the T/R switch devices are HBTs. They are coupled with microstrip impedance matching networks. The T/R switch includes a quarter-wave transmission line and a load which is arranged to absorb the leakage power of the antenna's transmit pulse.

The novel features of the invention are set forth with particularity in the appended claims. The invention will be best understood from the following description when read in conjunction with the accompanying drawings.

BRIEF DESCRIPTION OF THE DRAWINGS

FIG. 6 is a sectional view of a T/R switch/LNA that is arranged in accordance with the schematic of FIG. 1 and configured as a MMIC in accordance with the present system;

FIGS. 7A, 7B and 7C are sectional views which illustrate sequential steps in the fabrication of the MMIC of FIG. 6; and FIG. 8 is a sectional view of a T/R switch/LNA that is arranged in accordance with the schematic of FIG. 1 and configured as another MMIC in accordance with the present system.

DESCRIPTION OF THE PREFERRED EMBODIMENTS

Figure 1:
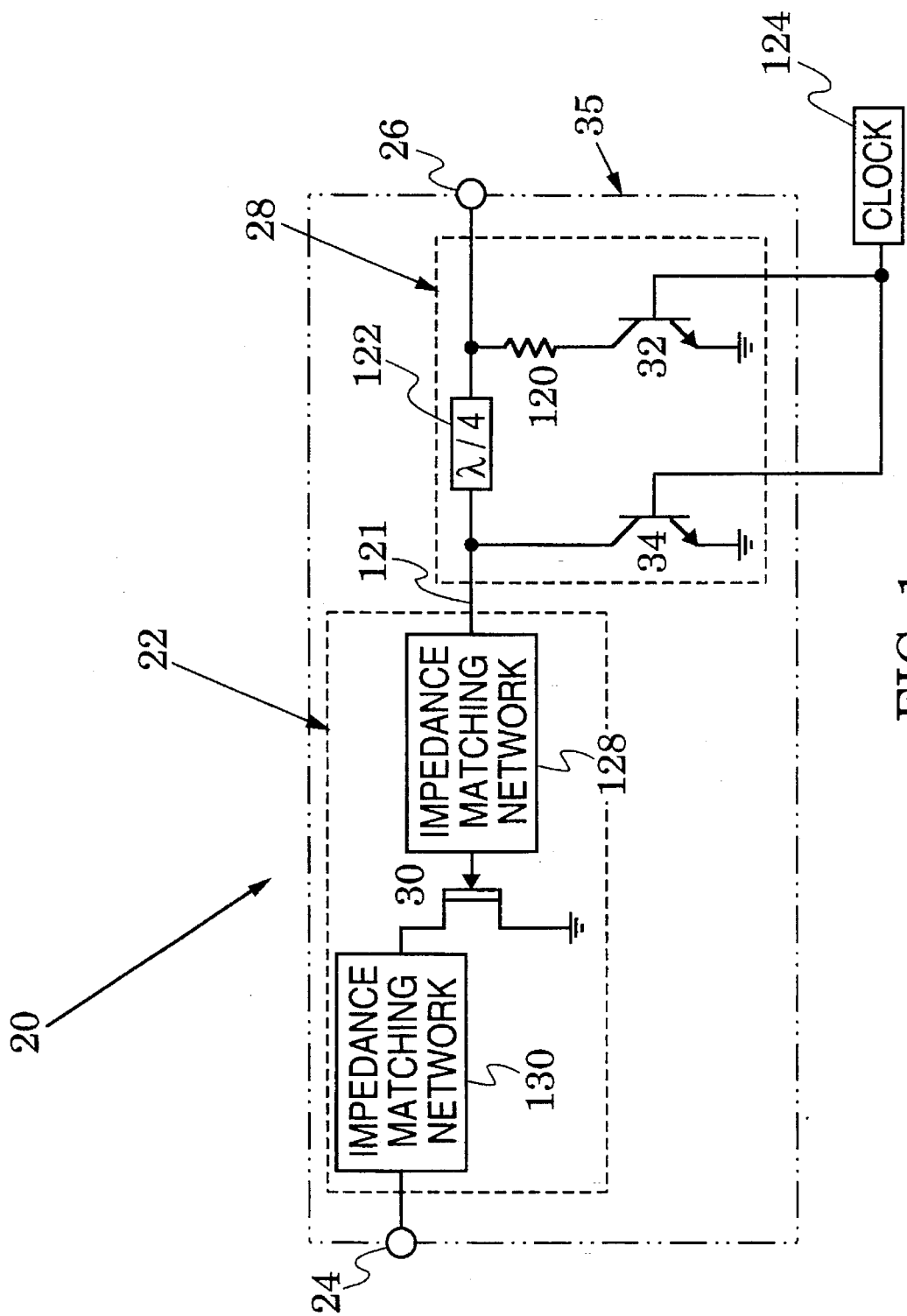
FIG. 1 is a schematic of an integrated T/R switch/LNA in accordance with the present invention.

FIG. 1 is a schematic of a T/R switch/LNA embodiment 20 in accordance with the present invention. The T/R switch/LNA 20 has an LNA 22 which receives radar echo signals through a receive port 26 and, in response, delivers amplified echo signals to a radar's processing circuits via an output port 24. The echo signals are received through a T/R switch 28 which is positioned ahead of the LNA 22 to protect it from radar transmit signals that might damage it. The T/R switch/LNA embodiment 20 is particularly directed for use in radar active array antennas. It is preferably configured as a MMIC with transistor device types that are best suited for their respective functions, i.e., the LNA 22 includes a HEMT 30 and the T/R switch 28 includes a pair of HBTs 32 and 34. Accordingly, the schematic indicates that the elements are realized in a monolithic semiconductor structure 35.

Figure 3:
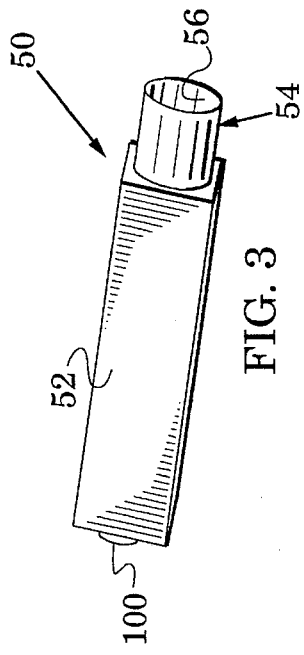
FIG. 3 is an enlarged, perspective view of a T/R module in the active array antenna of FIG. 2, the T/R module including a T/R switch/LNA in accordance with the schematic of FIG. 1.
Figure 2:
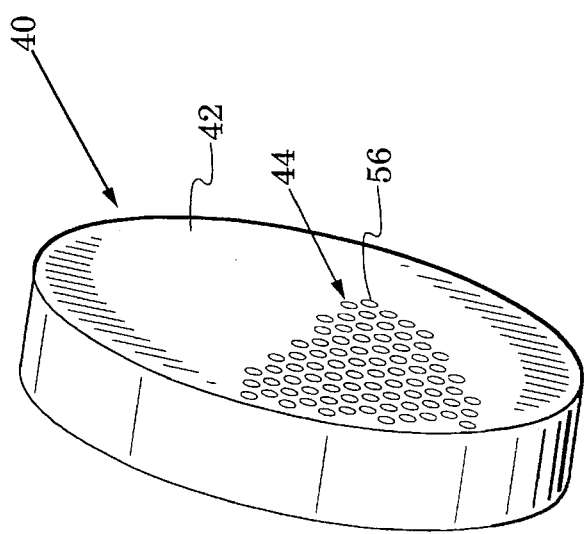
FIG. 2 is a perspective view of an active array antenna for a radar system.

To better understand the features of the T/R switch/LNA 20, attention is first directed to a typical radar active array antenna 40 in FIG. 2. The antenna 40 has an antenna face 42 which is partitioned into an array 44 of T/R modules. FIG. 3 shows that each T/R module 50 includes a solid-state module 52 which is coupled to free space through a radiative element 54. The radiative element 54 usually includes a simple antenna, e.g., a wire loop, that is housed within a horn 56. Only the horns 56 are visible at the antenna face 42 in FIG. 2.

Figure 4:
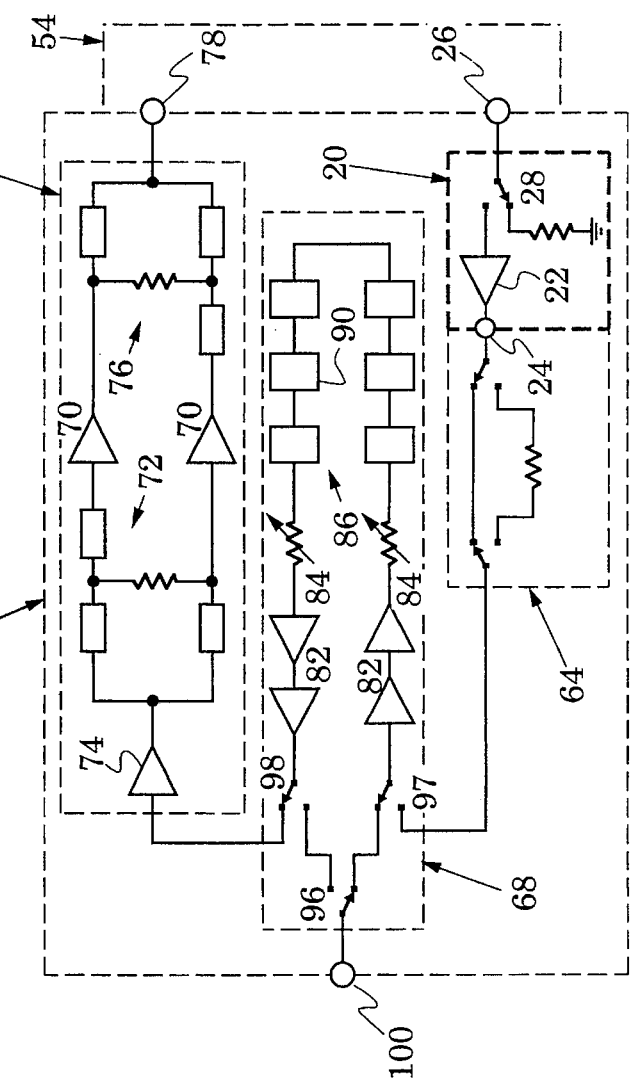
FIG. 4 is a schematic of the T/R module of FIG. 3.

A schematic 60 of the T/R module 50 is shown in FIG. 4. It includes the T/R switch/LNA 20, an automatic gain control (AGC) 64, a high-power transmit amplifier 66 and an amplifier/phase shifter 68. The transmit amplifier 66 has pair of high power amplifiers 70 which are driven through a power splitter 72 by a driver amplifier 74. The output of the amplifiers 70 are combined in a power combiner 76 which is coupled to the radiative element 54 by an output port 78 (the splitter 72 and the combiner 76 are shown as a combination of resistors and microstrip transmission lines which are indicated by rectangles).

The amplifier/phase shifter 68 includes two amplifier pairs 82, variable attenuators 84 and a phase shifter 86. The embodiment of FIG. 4 has six phase shifter elements 90, which enables the use of a six bit phase shift control, i.e., the phase of any signal transiting the amplifier/phase shifter 68 can be selectively controlled in steps as fine as 5.625° to achieve electronic beam steering in both the transmit and receive modes of the antenna 40 of FIG. 2.

Three switches 96, 97 and 98 permit a signal port 100 to be coupled to the transmit amplifier 66 through the amplifier/phase shifter 68 in an antenna transmit mode. These switches are reversed in the antenna receive mode so that the T/R switch/LNA 20 is coupled to the signal port 100 through the amplifier/phase shifter 68. In the transmit mode, the amplifier/phase shifter 68 is a preamplifier for the power amplifier 66. In the receive mode, the amplifier/phase shifter 68 is a postamplifier for the LNA 20.

In the transmit mode, radar drive pulses that are applied at the T/R signal port 100 are amplified by the amplifier/phase shifter 68 and the power amplifier 66 and coupled to the radiative element 54 via the output port 78. The phase of the signal that is radiated from the element 54 is selectively set by the phase shifter 86 so that it is in phase along a selected wavefront with the radiated signals from the other T/R modules of the array (44 in FIG. 2). The radar's transmit pulse will be directed in a beam that is orthogonal to the selected wavefront.

In the transmit mode, the T/R switch 28 of the T/R switch/LNA 20 is set as shown in FIG. 4 to protect the LNA 22 from transmit leakage power at the receive port 26. The array 44 of FIG. 2 may contain several hundred T/R modules 50 so that their combined transmit power is quite large, e.g., >1 KW. Without the protection of the T/R switch 28, the leakage power at the receive port 26 may damage the LNA 22.

The T/R module 50 is placed in its receive mode by reversing the positions of the switches 96, 97 and 98 and the T/R switch 28 shown in FIG. 4. In this mode, radar echo pulses are received through the receive port 26 and amplified by the combination of the LNA 66 and the amplifier/phase shifter 68. The phase of the phase shifters 86 is set to establish, in combination with the other T/R modules 50, a selected receive wavefront and, hence, a selected receive beam axis. The amplified signals are sent via the T/R signal port 100 to radar signal processing circuits for determination of target range and bearing.

In the receive mode, the T/R switch 28 must present a small insertion loss to the received signal because this loss directly degrades the receiver noise figure. When echo signals become very strong, the AGC 64 can be switched to insert an intentional loss which reduces the receiver's gain so that downstream circuits, e.g., the amplifier/phase shifter 68, are not overloaded.

Active array antennas provide several attractive features relative to more conventional radar antennas. In the transmit mode, they replace the single high-power microwave tube that is associated with conventional antennas with an array of power amplifiers at the antenna face. The failure of one or more T/R modules results in graceful antenna performance degradation rather than the catastrophic failure caused by the loss of a high-power microwave tube. The power of a microwave tube typically must transit a distribution network before being radiated from an antenna. These distribution path losses are reduced in an active array because the final amplification is at the antenna face 42.

In the receive mode, a lower noise figure can be achieved because of the decreased signal path to each LNA 22. In conventional designs, antenna feed structures precede a radar receiver with consequent degradation of noise figure performance. With the active array antenna 40, the system noise figure is substantially established at the antenna face 42 and is reasonably immune to downstream distribution losses. Advanced signal processing techniques are also facilitated in an active array antenna because the information that is provided by echo signals from the entire antenna face are available for processing. This array information is lost in conventional antennas.

With a description of the T/R modules 50 and the active array antenna 40 in hand, attention is now redirected to the T/R switch/LNA 20 of FIG. 1. In the T/R switch 28, the emitters of the HBTs 32 and 34 are connected to ground. The collector of HBT 32 is coupled to the receive port 26 by a load 120 whose impedance substantially matches the intrinsic impedance of the receive port 26, e.g., 50 ohms. The collector of the HBT 34 is coupled to the T/R switch output 121. A transmission line 122 has a length equal to one fourth of the signal wavelength and operates as an impedance converter. The line 122 connects the receive port 26 and the T/R switch output 121. A clock signal 124 from the radar's timing circuits is applied to the base of each HBT 32 and 34. In the LNA 22, the base of the HEMT 30 is connected to ground, an input matching network 128 couples its gate to the T/R switch output 121 and an output matching network 130 couples its drain to the output port 24.

In the antenna's transmit mode, the clock signal 124 causes the HBTs 32 and 34 to be switched on so that their collectors are substantially at ground potential. Thus, the HBT 34 presents a near short to one end of the transmission line 122. The quarter-wavelength transmission line 122 converts this impedance to a near open (high impedance) at its junction with the load 120. Since the other end of this load is effectively shorted to ground, the impedance at the input port 28 is substantially that of the load 120. Because the impedance of the load 120 is matched to that of the receive port 26, most of the signal at the receive port is absorbed in the load 120. Thus, the LNA 30 is isolated [protected] from transmit leakage signals.

In the antenna's receive mode, the clock signal 124 causes the HBTs 32 and 34 to be switched off so that their collectors present essentially open circuits to the ends of the transmission line 122. In this mode, the transmission line 122 essentially becomes part of the input matching network 128. The matching networks 128 and 130 (in conjunction with the transmission line 120) are designed to enhance the noise figure of the HEMT 30 in the receive mode.

Figure 5A:
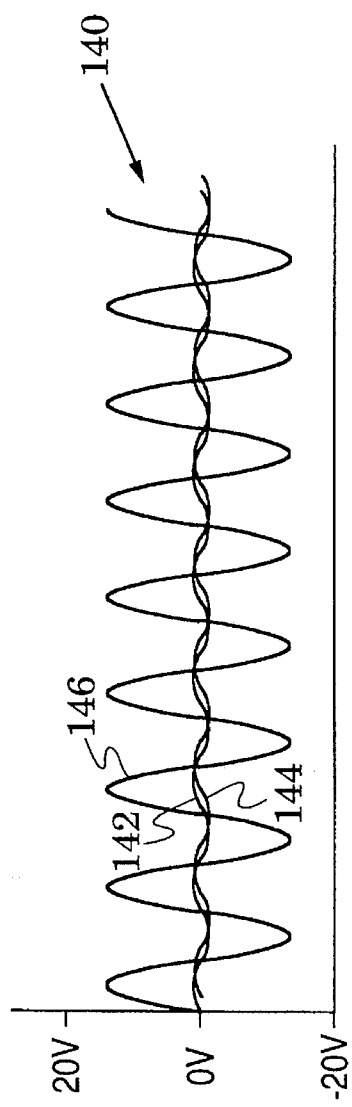
FIG. 5A is a graph which illustrates voltage waveforms in the T/R switch/LNA schematic of FIG. 1 when the active array antenna of FIG. 2 is in its transmit mode.

The diagram 140 of FIG. 5A illustrates typical voltage waveforms in the T/R switch/LNA 20 when it is in the antenna's transmit mode and the HBTs 32 and 34 are turned on. The waveforms 142 and 144 represent the voltages at the collectors of HBT 32 and 34 respectively. The waveform 146 represents the voltage at the input port 26. Obviously, most of the transmit leakage voltage is across the load 120 so that it substantially absorbs the leakage power. Only a small voltage (curve 144) is present at the input of the LNA 22.

Figure 5B:
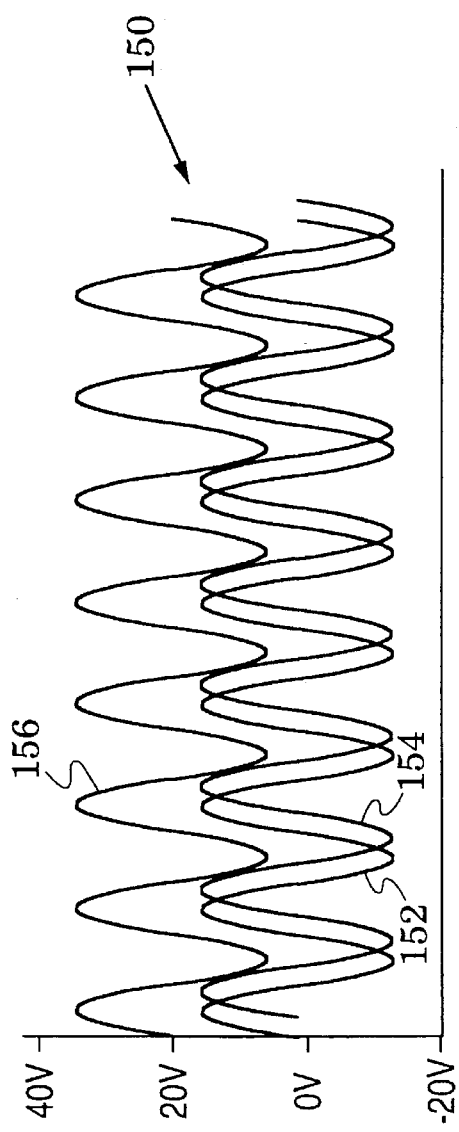
FIG. 5B is a graph which illustrates voltage waveforms in the T/R switch/LNA schematic of FIG. 1 when the active array antenna of FIG. 2 is in its receive mode.

The diagram 150 of FIG. 5B illustrates typical voltage waveforms in the T/R switch/LNA 20 when it is in the antenna's receive mode and the HBTs 32 and 34 are turned off. The waveforms 152 and 154 represent the voltages at opposite ends of the quarter-wave transmission line 122. They are approximately equal (and have a slight phase shift) which indicates that most of the input power is transmitted through the line 122 with little loss. The waveform 156 represents the voltage at the collector of the HBT 32. This waveform includes the DC bias on the collector. With the assumed input waveform 152 of FIG. 5B, the voltage on the collector of HBT 32 exceeds 30 volts. A HEMT would not be able to survive this voltage magnitude.

The HEMT 30 and the HBTs 32 and 34 are respectively selected for the LNA 22 and the T/R switch 28 because they are particularly suited for the functions of these circuits. A high performance T/R switch is fast, has a low on-resistance in the antenna's transmit mode and has a large breakdown voltage rating so that it can withstand large voltages in the antenna's receive mode. In conventional monostructure bipolar transistors, the only control over the device characteristics are through doping levels and device dimensions.

To meet the switch requirements, the emitter to collector current ratio $\alpha$ is preferably close to one. In a monostructure, this requires that the emitter be doped heavier than the base and that the base width be reduced. However, a narrow base that has a low doping level will exhibit high resistance which causes the switch to have a high on-resistance. In addition, the heavy emitter doping reduces its bandgap which permits an increased injection of base carriers into the emitter with a consequent drop in gain.

In contrast, in an HBT the emitter can be formed from a high bandgap semiconductor so that it can be heavily doped and its bandgap is still high enough to suppress the injection of base carriers. The base can now be doped heavily without paying the penalty of low gain. As a result, the base resistance can be decreased even with thin base regions. In addition, the collector can also be formed from a wide bandgap material which permits a large breakdown voltage to be obtained.

In the fabrication of a typical HEMT, an undoped, narrow-bandgap "buffer" layer is grown over a semi-insulating substrate. A heterostructure is then formed by depositing an undoped, wide-bandgap "spacer" layer followed by a heavily doped, wide-bandgap "donor" layer. Finally, a heavily doped "cap" layer is formed into which ohmic contacts are formed. The cap layer is etched off in one area and a Schottky gate is deposited.

The difference in bandgaps creates a quantum well at the interface between the buffer and the spacer layers. The electrons from the donor layer are trapped in this well. Because these electrons are free to move in the plane of the device but are restrained in the device growth direction, they are said to form a "two-dimensional gas".

Because these free electrons are separated from their dopants, they are not subject to ionized impurity scattering and their mobility is greatly improved. This causes the device to have a very low resistance between the source and the gate and a superior noise figure. However, the breakdown rating of a HEMT is quite low, e.g., on the order of 5–10 volts. This makes them unsuitable for use in the T/R switch. Their breakdown rating can be improved but typically at the cost of a degraded noise figure.

FIG. 6 is a sectional view of the T/R switch/LNA 20 realized as a MMIC 160 whose circuit is arranged in accordance with the schematic of FIG. 1. The MMIC 160 is realized as a monolithic semiconductor structure in a series of process steps, some of which are exemplified by FIGS. 7A–7C. In FIG. 7A, a depression 162 has been formed in a semi-insulating substrate 163 by conventional methods, e.g., with a suitable etch through a window in a resist material that was previously deposited on the substrate 163.

In FIG. 7B, a first semiconductor heterostructure 164 has been formed on the substrate 163. Over the heterostructure 164, an electrically insulative isolation layer 166 (e.g., a GaAs or an InAlAs layer grown by molecular beam epitaxy (MBE) at a relatively low temperature, a silicon dioxide layer or a silicon nitride layer) has been deposited. Finally, a second semiconductor heterostructure 168 has been formed over the isolation layer 166. Each of these layers has a respective portion 164B, 166B and 168B that is alligned with the depression 162 and a respective portion 164A, 166A and 168A that is positioned laterally from the depression.

In FIG. 7C, the portions 166A and 168A of the isolation layer 166 and second heterostructure 168 have been removed, e.g., with resist and etching techniques. In the embodiment 160, the depth of the depression 162 is preferably selected to cause the remaining heterostructure portions 168B and 164A to be coplanar.

In FIG. 6, final processing steps have adapted the heterostructure portion 164A into an amplifier element in the form of the HEMT 30 and other final processing steps have adapted the heterostructure portion 168B into switching elements in the form of the HBTs 32 and 34. The final processing steps include implantations for lateral definition of transistor elements, via hole formation to facilitate interconnections, fabrication of ohmic contacts and deposition of gate contacts.

Metallization has been deposited to form the impedance matching networks 128 and 130 and the quarter-wave transmission line 122 of FIG. 1. These structures are preferably formed in microstrip with appropriate portions adapted to receive microwave connectors (not shown) and form the input and output ports 26 and 24. A thin film of a resistive material, e.g., titanium, tantalum, nickel chromium or the like, has been deposited to form the load 120. The deposition of these interconnecting structures is facilitated by the coplanar relationship of the heterostructure portions 164A and 168B of FIG. 7C.

The processing steps exemplified in FIGS. 7A–7C cause the portions 164A and 166A to remain in the depression 162 in the MMIC 160 of FIG. 6. These layers were formed to enable formation of the coplanar, functional portions 168A and 164B, which were then adapted to the HEMT 30 and the HBTs 32, 34. The portion 164A does not have any detrimental effect upon the HBTs 32 and 34 because it is electrically separated by the isolation portion 166A, which also isolates the HBTs from each other.

In the structure of FIG. 6, the first heterostructure, which formed the depression 162, was formed to be adapted into the HEMT 30 and the second heterostructure was formed to be adapted into the HBTs 32 and 34. This order can, of course, be reversed. For example, FIG. 8 illustrates a T/R switch/LNA realized as another MMIC 170. In the MMIC 170, a portion 172A of a heterostructure is associated with a depression 174 in a substrate 176. A series of processing steps have adapted another portion of this heterostructure into the HBTs 32 and 34. A series of processing steps have adapted another heterostructure into the HEMT 30 and an isolation layer 178 separates the HEMT 30 and the portion 172A. A heterostructure that is intended to form HBTs would typically have a semi-insulating substrate. This substrate can be used to isolate the HBTs 32 and 34 from each other.

The processing steps of FIGS. 7A–7C are described in greater detail in U.S. Pat. No. 5,049,522 which issued on Sep. 17, 1991 and was to assigned to Hughes Aircraft Company, the assignee of the present invention.

In an exemplary realization of the MMIC 160, HEMT and HBT heterostructure configurations, as well as a semiconductor system for the fabrication of these heterostructures are selected. The formation of the first and second heterostructures 164 and 168 of FIG. 7B and the final processing steps and the interconnections of FIG. 6 are then be performed.

A variety of HEMT and HBT heterostructures with suitable semiconductor systems and final processing steps for their realization are well known in the monolithic semiconductor art. For example, see Sze, S. M., *High-Speed Semiconductor Devices*, Wiley-Interspace Publishing, New York, 1990, pp. 283–322 and 358–388; Singh, Jasprit, *Semiconductor Devices*, McGraw-Hill, New York, 1994, pp. 335–348 and 376–383; Liao, Samuel Y., *Microwave Devices and Circuits*, Prentice Hall, Englewood Cliffs, 1990, pp. 193–198 and 230–236; and Williams, Ralph, *Modern GaAs Processing Methods*, Artech House, Boston, 1990, pp. 297–302.

The semiconductor system for the heterostructures would preferably be selected from the III and V groups of the periodic table. Exemplary systems for HEMT and HBT realization are the gallium arsenide/aluminum gallium arsenide ($GaAs/Al_xGa_{1-x}As$) system and the indium aluminum arsenide/indium gallium arsenide ($In_{1-x}Al_xAs/In_{1-x}Ga_xAs$) system; these systems are typically lattice matched to a GaAs substrate and an indium phosphide (InP) substrate, respectively.

The T/R switch/LNA embodiment 160 of FIG. 6 is realized with dissimilar transistor device types, the HEMT 30 and the HBTs 32 and 34, which were selected because they are best suited to perform their respective functions in the LNA 22 and the T/R switch 28 of FIG. 1. The processes illustrated in FIGS. 6 and 7A–7C enable the fabrication of the MMIC 160 with these dissimilar transistors in a selected semiconductor system. Although a T/R switch has been described with a particular arrangement of HBTs, the teachings of the invention extend to other equivalent HBT arrangements, e.g., one that includes a series HBT which couples the input port 26 and the HEMT 30 in FIG. 1.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A monolithic T/R switch/LNA having an input port for reception of a radar signal and an output port for delivery of an amplified radar signal, comprising:

a semiconductor substrate having a depression;

a first semiconductor heterostructure having lateral and depressed portions that are carried on said substrate with said lateral portion positioned laterally from said depression and said depressed portion positioned in said depression; and a second semiconductor heterostructure carried over said first heterostructure's depressed portion;

wherein said first and second heterostructures are formed in a predetermined semiconductor system that includes at least one semiconductor layer having a first bandgap and at least one semiconductor layer having a second bandgap that is wider than said first bandgap, an amplifier element with an input and an output is formed from one of said first heterostructure's lateral portion and said second heterostructure and at least one switching element is formed from the other of said first heterostructure's lateral portion and said second heterostructure, said at least one switching element is arranged to selectively couple said amplifier element's input and said input port during said radar signal reception and isolate said amplifier's input from said input port at other times, and said amplifier element's output is coupled to said output port.

2. The T/R switch/LNA of claim 1, wherein said amplifier element comprises a HEMT.

3. The T/R switch/LNA of claim 1, wherein said at least one switching element comprise respective HBTs.

4. The T/R switch/LNA of claim 1, wherein said semiconductor system comprises $GaAs/Al_xGa_{1-x}As$.

5. The T/R switch/LNA of claim 4, wherein said substrate comprises GaAs.

6. The T/R switch/LNA of claim 1, wherein said semiconductor system comprises $In_{1-x}Al_xAs/In_{1-x}Ga_xAs$.

7. The T/R switch/LNA of claim 6, wherein said substrate comprises InP.

8. The T/R switch/LNA of claim 1, wherein said first heterostructure's lateral portion and said second heterostructure are substantially coplanar.

9. The T/R switch/LNA of claim 1, further including:

a microstrip input impedance matching network coupling said amplifier element's input and said switching element; and a microstrip output impedance matching network coupling said amplifier element's output and said output port.

10. The T/R switch/LNA of claim 1, wherein said at least one switching element comprises first and second switching elements, with said second switching element coupled to said amplifier element's input, and further including:

a transmission line coupling said amplifier element's input and said input port; and a load coupling said first switching element and said input port.

11. The T/R switch/LNA of claim 10, wherein said first and second switching elements each comprise an HBT.

12. The T/R switch/LNA of claim 10 wherein said transmission line comprises microstrip and said load comprises a thin film of a resistive material.

13. The T/R switch/LNA of claim 1, further including an electrically insulative isolation layer between said first heterostructure's lateral portion and said second heterostructure.

14. A T/R module for an active array antenna, said module having a signal port, an input port and an output port, said module comprising:

a power amplifier coupled to said output port;

a phase shifter;

a T/R switch/LNA having an output; and a switching network adapted to connect said phase shifter between said signal port and said power amplifier in a transmit mode of said antenna and to connect said phase shifter between said signal port and said output of said T/R switch/LNA in a receive mode of said antenna;

wherein said T/R switch/LNA includes:

a semiconductor substrate configured to have a depression;

a first semiconductor heterostructure having lateral and depressed portions that are carried on said substrate with said lateral portion positioned laterally from said depression and said depressed portion positioned in said depression; and a second semiconductor heterostructure carried over said first heterostructure's depressed portion;

wherein said first and second heterostructures are formed in a predetermined semiconductor system that includes at least one semiconductor layer having a first bandgap and at least one semiconductor layer having a second bandgap that is wider than said first bandgap, an amplifier element is formed from one of said first heterostructure's lateral portion and said second heterostructure with said amplifier element coupled to said output, at least one switching element is formed from the other of said first heterostructure's lateral portion and said second heterostructure, and said at least one switching element is arranged to selectively couple said amplifier element and said input port during said radar signal reception and isolate said amplifier element from said input port at other times.

15. The T/R switch/LNA of claim 14, wherein said amplifier element comprises a HEMT.

16. The T/R switch/LNA of claim 14, wherein said at least one switching element comprise respective HBTs.

17. The T/R switch/LNA of claim 14, wherein said first heterostructure's lateral portion and said second heterostructure are substantially coplanar.

18. The T/R switch/LNA of claim 14, further including:

a microstrip input impedance matching network coupling said amplifier element and said switching element; and a microstrip output impedance matching network coupling said amplifier element and said output.

19. The T/R switch/LNA of claim 14, wherein said at least one switching element comprises first and second switching elements, with said second switching element coupled to said amplifier element, and further including:

a transmission line coupling said amplifier element and said input port; and a load coupling said first switching element and said input port.

20. The T/R switch/LNA of claim 19, wherein said first and second switching elements each comprise an HBT.

* * * * *